US006766448B2

(12) United States Patent
Kubota

(10) Patent No.: US 6,766,448 B2
(45) Date of Patent: Jul. 20, 2004

(54) MICROCOMPUTER FOR TRANSFERRING PROGRAM DATA TO AN INTERNAL MEMORY FROM AN EXTERNAL MEMORY CONNECTED VIA A BUS AND A METHOD THEREFOR

(75) Inventor: Kei Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 610 days.

(21) Appl. No.: 09/758,164

(22) Filed: Jan. 12, 2001

(65) Prior Publication Data
US 2001/0052068 A1 Dec. 13, 2001

(30) Foreign Application Priority Data
Jan. 13, 2000 (JP) ........................................ 2000-004414

(51) Int. Cl.[7] ...................... G06F 15/177; G06F 13/28; G06F 12/00
(52) U.S. Cl. ................... 713/2; 713/1; 710/22; 710/62; 711/166
(58) Field of Search ........................ 713/1, 2; 710/22, 710/62; 711/166, 202; 235/492

(56) References Cited

U.S. PATENT DOCUMENTS

| 4,462,086 | A | * | 7/1984 | Kurakake | 711/166 |
| 4,482,951 | A | * | 11/1984 | Swaney et al. | 710/23 |
| 4,628,448 | A | * | 12/1986 | Murao | 712/39 |
| 5,038,025 | A | * | 8/1991 | Kodera | 235/492 |
| 5,355,466 | A | * | 10/1994 | Iwamoto | 710/108 |
| 5,465,225 | A | * | 11/1995 | Witte | 708/524 |
| 6,125,409 | A | * | 9/2000 | Le Roux | 710/22 |
| 6,195,733 | B1 | * | 2/2001 | Nair et al. | 711/202 |
| 6,256,781 | B1 | * | 7/2001 | Okajima | 710/62 |
| 6,546,517 | B1 | * | 4/2003 | Yoshimura | 714/763 |

FOREIGN PATENT DOCUMENTS

| JP | 61-133437 |   | 6/1986 |
| JP | H1-292531 A |   | 11/1989 |
| JP | 1-304563 | * | 12/1989 |
| JP | 2-76038 | * | 3/1990 |
| JP | H2-89556 U |   | 7/1990 |
| JP | 2-230480 | * | 9/1990 |
| JP | H5-204636 A |   | 8/1993 |
| JP | H11-110222 |   | 4/1999 |

OTHER PUBLICATIONS

Nakamura et al., "Effectiveness of Register Preloading on CP–PACS Node Processor", IEEE 1998, pp 83–90.*

* cited by examiner

Primary Examiner—Jeffrey Gaffin
Assistant Examiner—Chun Cao
(74) Attorney, Agent, or Firm—Sughrue Mion, PLLC

(57) ABSTRACT

It is to provide a method of transferring a program to an internal memory from an external memory at a high speed and at a high efficiency. The external memory has program data to be transferred and set data of a dedicated register including wait information of the program data. A microcomputer has an internal ROM to which a transfer program for transferring data to an internal RAM from the external memory is prestored. If a CPU in the microcomputer accesses set data for the dedicated register at the head address of the external memory and receives the set data including the wait information of data to be transferred when reset is released, the data is transferred to the internal RAM via an address bus and a data bus by executing the transfer program in the internal ROM. An area of the transferred data in the internal RAM is rearranged at an area including a boot area and a vector table and the program data is executed by the CPU.

5 Claims, 4 Drawing Sheets

| BIT POSITION OF DEDICATED REGISTER | DESCRIPTION |
|---|---|
| 0 | CONTROL NUMBERS OF (0 TO 7) OF WAITS OF EXTERNAL MEMORY |
| 1 | |
| 2 | |
| 3 | RESERVATION |
| 4 | SET HEAD ADDRESS OF INTERNAL RAM TO "0X00000H" BY "1" |
| 5 | INTERNAL RESET BY "1" (SET PC TO "0") |
| 6 | RESERVATION |
| 7 | SET ACCESS DESTINATION OF CPU TO INTERNAL ROM FROM EXTERNAL MEMORY BY "1" |

MICROCOMPUTER FOR TRANSFERRING PROGRAM DATA TO AN INTERNAL MEMORY FROM AN EXTERNAL MEMORY CONNECTED VIA A BUS AND A METHOD THEREFOR

BACKGROUND OF THE INVENTION

1. Field of the Invention

The present invention relates to a microcomputer which is connected to an external memory via a bus and transfers program data to an internal memory from the external memory and a method of transferring a program thereof, more particularly, to a method of transferring a program by which a program can be transferred and executed fast and efficiently and a microcomputer using the method.

2. Description of the Related Art

FIG. 1 shows one of conventional microcomputers using the aforementioned method of transferring the program.

Referring to FIG. 1, in a microcomputer 110, user programs to be executed are written to an internal RAM 111 which is readable and writable in association with the variation of user programs. Generally, the various user programs are stored in an external memory 120 as transfer data and are downloaded to the internal RAM 111 by transferring data from the external memory 120. However, a transfer program to be downloaded to the internal RAM 111 is also stored in the external memory 120 together with the transfer data to be transferred as a download program.

In the case of using the method, in the microcomputer 110, the transfer data is written to the internal RAM 111 according to the download program in the external memory 120 and, therefore, a storing area in the internal RAM 111 is fixed. Accordingly, a vector table needs to be arranged at an area in the external memory 120 at which an access time is longer than that to the internal RAM 111, so that performance of response to an interrupt is decreased when a CPU 112 executes the download program. Also, because an area of the internal RAM 111 is different from an area of the transfer data at which the program to be transferred to the internal RAM 111 is arranged, a wasteful space is caused in the internal RAM 111. Further, if the internal RAM 111 in the microcomputer 110 is used as an instruction RAM, program data needs to be transferred to the instruction RAM. Furthermore, the method must be executed according to the user programs.

A microcomputer to solve the above-mentioned problems is disclosed in Japanese Unexamined Patent Publication No. 61-133437, namely JP-A 61-133437, in which, as shown in FIG. 2, a microcomputer 210 has a loader in an internal ROM 211. By the loader, an external user program 220 is downloaded to an internal RAM 212. The loader inputs a symbol to be inputted via an input/output port 213 to the internal RAM 212.

In other words, in the case of using the above-mentioned conventional method of transferring the program as shown in FIG. 1, the transfer program to be downloaded to the internal RAM 111 is stored in the external memory 120 and the maximum number of waits is set just after reset is normally released. In JP-A 61-133437, the transfer data is downloaded by using a port function. Accordingly, the conventional methods of transferring the program are not preferable because a certain time to transfer data is necessary and fast data-transfer is impossible.

SUMMARY OF THE INVENTION

It is an object of the present invention to provide a method of transferring a program by which fast and efficient transfer of data is possible and a microcomputer using the method.

According to one aspect of the present invention, there is provided a method of transferring a program of a microcomputer to an internal memory from an external memory which is connected to the microcomputer via a bus, including the steps of, in advance, providing in the microcomputer an internal ROM for storing program data which is recorded in the external memory as a transfer program serving as algorithm to be transferred to the internal memory, and directly transferring the program data which is recorded in the external memory to the internal memory from the external memory by using an address bus and a data bus in accordance with a transfer program of the internal ROM.

Thus, data is transferred between the microcomputer and the external memory by using the address bus and the data bus, so that a transfer program for downloading which transfers a user program is stored in the internal ROM and a CPU directly executes the transfer program in the microcomputer. Further, for downloading of the user program, the use of an input/output port is unnecessary and, therefore, the data can be transferred at a high speed.

Preferably, the program data to be transferred and set data including wait information thereof may be recorded in the external memory, and the microcomputer may receive at least the wait information before the program data which is recorded in the external memory is transferred to the internal memory.

Accordingly, the microcomputer sets the number of waits of the external memory and, then, uses the address bus and the data bus. Thereby, the data can be transferred efficiently.

Further, preferably, the microcomputer may start the transfer program which is stored in the internal ROM by transmitting the set data at a predetermined area including the wait information from the external memory via the address bus and the data bus when reset is released, may transfer the program data from the predetermined area to an internal RAM which is readable and writable via the address bus and the data bus on the transfer program in accordance with the wait information, may rearrange an area of the internal RAM of data obtained by converting a head address of the data that is transferred to the internal RAM into a head address of the predetermined area in the external memory and also by transferring the converted data to an area including a boot area and a vector table for interrupt, and may start the execution of the program by the transferred program data. The arrangement destination is a vector table area, thereby improving the performance of the response to interrupt.

According to another aspect of the present invention, there is provided a microcomputer for transferring program data from an external memory which is connected thereto via a bus to an internal memory, including an internal ROM for pre-storing a transfer program which transfers program data to be transferred to the internal memory from the external memory in which the program data to be transferred at a predetermined area and set data including wait information thereof are recorded, and an internal RAM including a boot area and a vector table, wherein on the transfer program, the program data to be transferred is transferred to the internal RAM and, thereafter, an area of the internal RAM is rearranged at the predetermined area of the external memory.

Preferably, the microcomputer further may include a dedicated register for controlling a switching operation of an address and a signal to execute the transfer program of the internal ROM, and the dedicated register rearranges the area of the internal RAM to an area including the boot area and the vector table by switching and changing a head address of the internal RAM to a head address of the predetermined area in the external memory when the transfer of the program data ends.

DESCRIPTION OF THE PREFERRED EMBODIMENTS

Hereinbelow, preferred embodiments of the present invention will be described in detail with reference to the drawings.

In a microcomputer according to the present invention, an internal RAM comprises a boot area at an address "0x00000H" and a vector table for interrupt which has skipped-addresses fixed and corresponding to interrupts at addresses subsequent to an address "0x00000H".

According to a main function of the present invention, under a transfer program which is prestored in an internal ROM, data is automatically transferred to the internal RAM from the head address of an external memory, and after the transfer ends, a storing area of the transferred data is rearranged at a space including the boot area and the vector table for interrupt.

Figure 1:
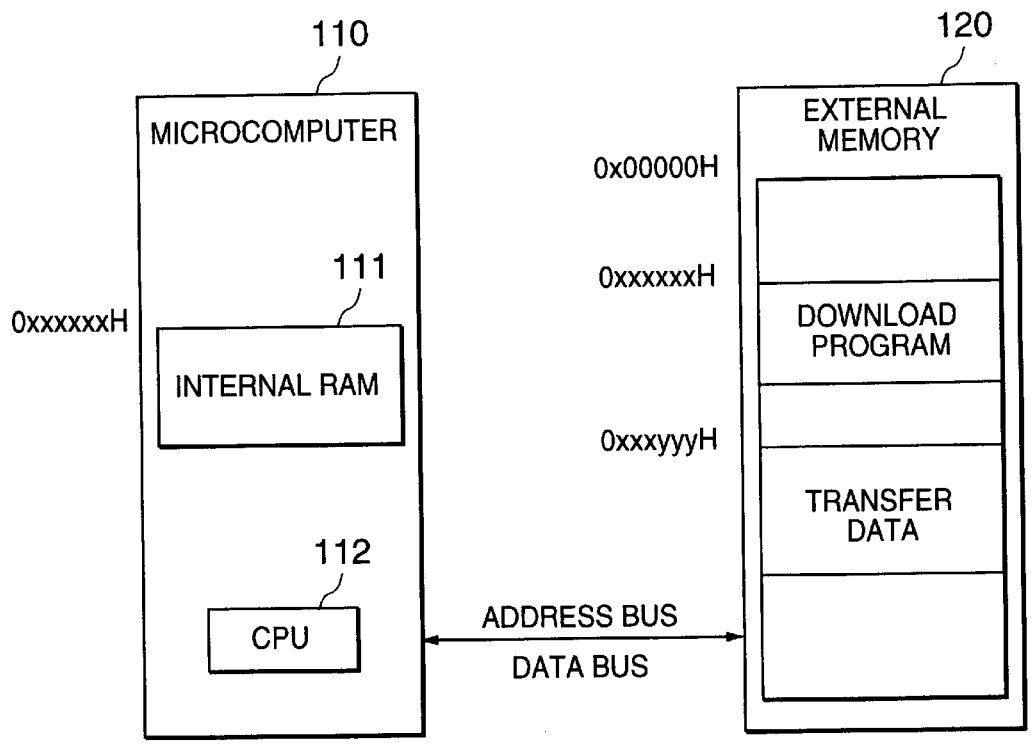
FIG. 1 is a block diagram showing one example of conventional functions.
Figure 2:
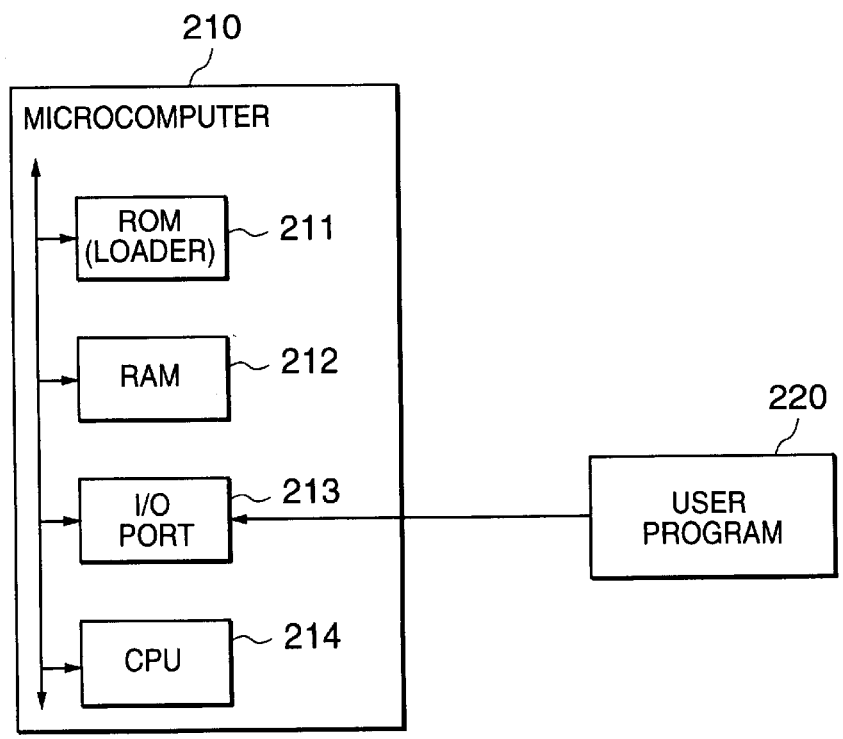
FIG. 2 is a block diagram showing another example of the conventional functions.
Figure 3:
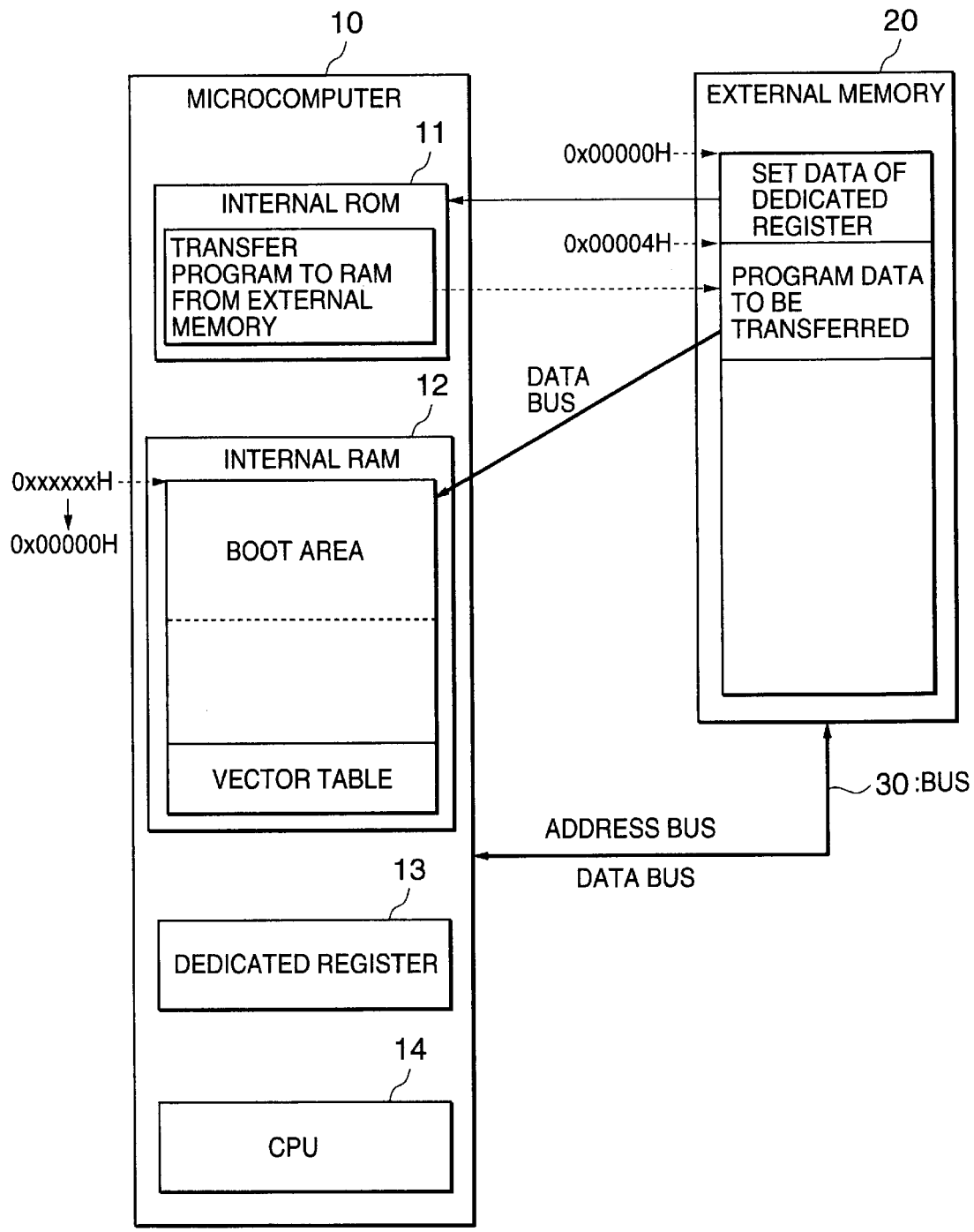
FIG. 3 is a block diagram showing functions of one embodiment according to the present invention.

FIG. 3 is a block diagram showing functions of one embodiment according to the present invention. Referring to FIG. 3, only a part related to the present invention is shown and a part unrelated thereto is not shown because of the simple description.

A microcomputer 10 in FIG. 3 has an internal ROM 11, an internal RAM 12, a dedicated register 13, and a CPU 14. Set data of the dedicated register 13 and program data as a user program to be transferred are stored in the external memory 20 which is connected to the microcomputer 10 via bus 30 including an address bus and a data bus.

The internal ROM 11 prestores a transfer program based on an algorithm for transferring data to the internal RAM 12 from the external memory 20 therein, The internal RAM 12 has a boot area for storing data to be transferred from the external memory 20 and a vector table for interrupt.

The dedicated register 13 stores wait information of the program data to be transferred from the external memory 20 in response to the set data of the dedicated register 13, assigns an access destination of the CPU 14, and controls switching of address information of memories as will be described in detail with reference to FIGS. 4 and 5.

The CPU 14 executes the transfer program which is stored in the internal ROM 11 when the user program is downloaded to the internal RAM 12 from the external memory 20 as program data and, after the transfer ends, executes the user program which is downloaded to the internal RAM 12.

The external memory 20 has an area of the set data of the dedicated register 13 at addresses starting from the head address "0x00000H" to an address "0x00003H" and a storing area of the program data to be transferred at addresses subsequent to an address "0x00004H". The area of the set data of the dedicated register 13 includes the number of waits of the program data to be transferred which is stored starting from the address "0x00004H" as wait information.

Next, the dedicated register 13 in FIG. 3 will be described with reference to FIGS. 4 and 5.

Figures 4, 5:
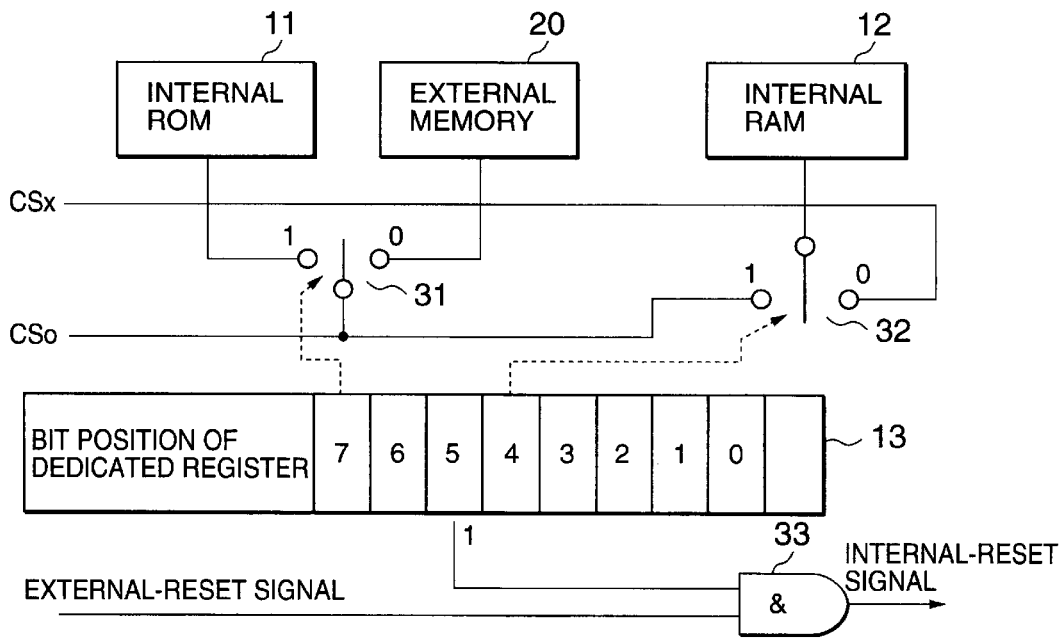
FIG. 4 is a diagram showing one example of descriptions of functions corresponding to bit positions of a dedicated register in FIG. 3.
FIG. 5 is a diagram showing one format of the connection corresponding to the bit positions of the dedicated register in FIG. 3.

As shown in FIG. 4, at bit positions 0 to 2 of the dedicated register 13, the number of waits of the external memory 20 is controlled. Normally, the maximum number of waits is set just after reset is released and a proper number of waits is set starting from the external memory 20 when the transfer starts at the bit positions 0 to 2. Bit positions 3 and 6 are used for reservation.

At a bit position 4, an area other than the address "0x00000H" is selected by setting a bit "0" when reset is released. However, the head address of the internal RAM 12 in which the transfer data is stored is switched to the address "0x00000H" by setting a bit "1" after the data is transferred.

At a bit position 5, OR operation together with an external reset signal is executed, and the output as the OR operation result becomes an internal reset signal. When the microcomputer 10 is reset, a bit "0" is set, the internal reset signal is outputted by the OR operation of the bit "1" and the external reset signal, and a program counter "0" is set by the internal reset, thereby starting the execution of the program in the internal RAM 12.

At a bit position 7, the switching of signals of the external memory 20 and the internal ROM 11 is controlled. That is, the bit "0" is set by the internal reset, thereby accessing the external memory 20, and the bit "1" is set, thereby accessing the internal ROM 11. When both the external memory 20 and the internal RAM 12 can be accessed, the program stored in the internal RAM 12 is executed.

Figure 6:
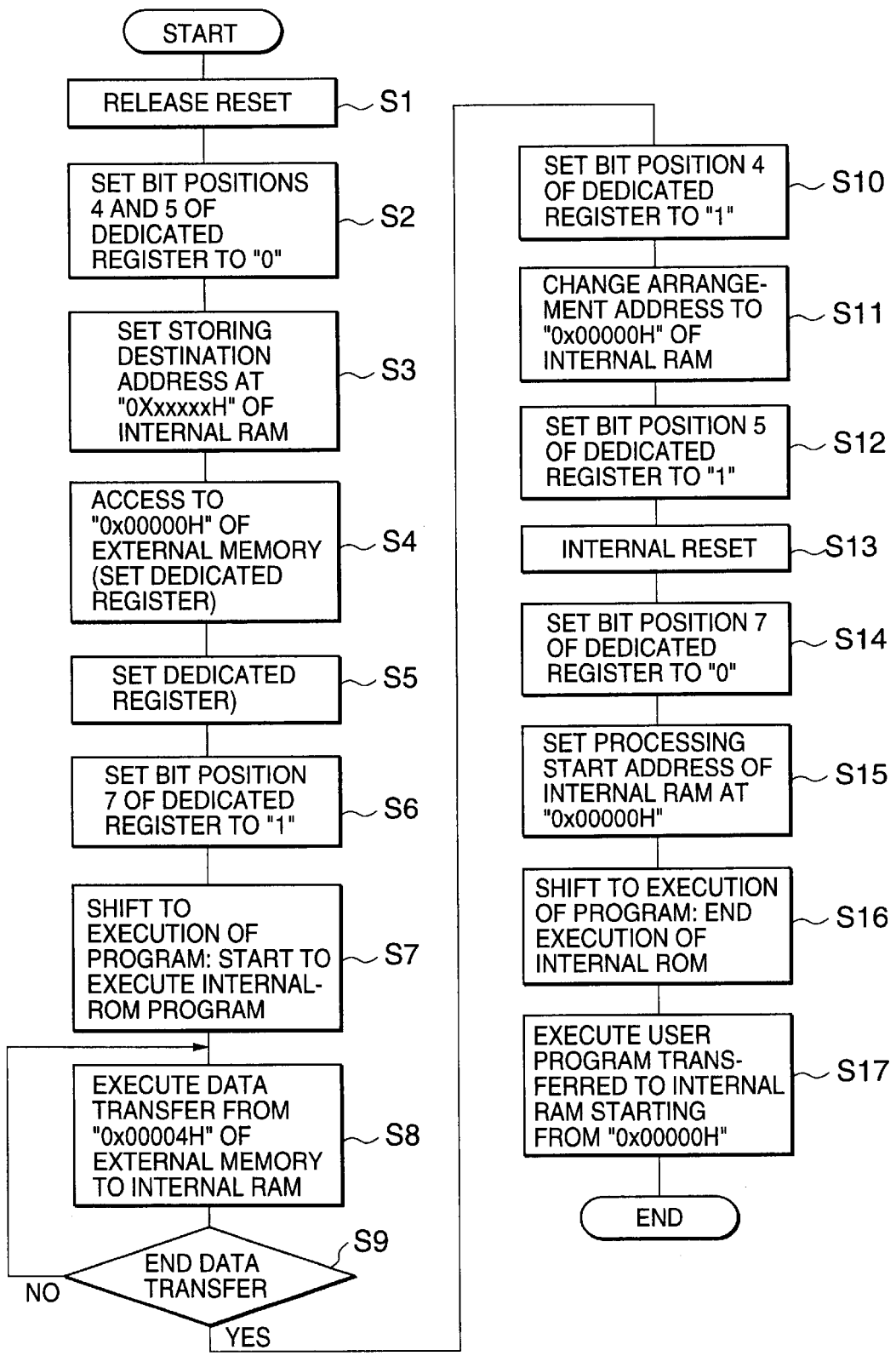
FIG. 6 is a flowchart of data transferring in one embodiment according to the present invention.

Next, a description is given of a processing routine for downloading the program data to be transferred as the user program to the internal RAM 12 from the external memory 20 with reference to FIG. 6 together with FIGS. 3 to 5.

In the microcomputer 10, reset is released (in step S1), and thereafter, the CPU 14 sets the bit positions 4 and 5 of the dedicated register 13 to the bit "0" (in step S2). And then, a storing address "0xxxxxH" for receiving the transfer data in the internal RAM 12 is set (in step S3), and the head address "0x00000H" of the external memory 20 is accessed (in step S4).

The set data of the dedicated register 13 is obtained from the head address "0x00000H" of the external memory 20. Thereby, the CPU 14 sets the number of waits of the transfer data to the bit positions 0 to 2 of the dedicated register 13 based on the obtained set-data (in step S5) and sets the bit "1" to the bit position 7 (in step S6).

By setting the bit "1" to the bit position 7, the processing routine shifts to the execution of the transfer program. The CPU 14 starts to execute the transfer program which is stored in the internal ROM 11 (in step S7). In other words, since a set sequence of the dedicated register 13 is stored as the set data at the address "0x00000H" of the external memory 20, the data is transferred to the internal RAM 12 from the address "0x00004H" at which a branch instruction to a start address is arranged (in step S8).

No data is transferred to the area at the address "0x00000H" to the address "0x00003H" of the external memory 20, so that NOP (no operation) code is automatically written in accordance with the transfer program of the internal ROM 11.

After the data transfer ends (YES in step S9), the bit "1" is set at the bit position 4 of the dedicated register 13 under the transfer program of the internal ROM 11 (in step S10). Then, an arrangement address of the internal RAM 12 is changed from the address "0x00000H" of the external memory 20 (in step S11) and is rearranged at the area including the boot area and the vector table. The bit "1" is set at the bit position 5 of the dedicated register 13 under the transfer program of the internal ROM 11 (in step S12) and, thereafter, the internal reset is automatically executed (in step S13).

After the internal reset in step S13, the CPU 14 sets the bit "0" at the bit position 7 of the dedicated register 13 (in step S14), thereby setting a program-start address of the internal RAM 12 at the head address "0x00000H" (in step S15). Steps S1 to S15 are based on the execution of the transfer program which is stored in the internal ROM 11. After the set processing-routine, step shifts to the execution of a program, the CPU 14 ends the execution of the internal ROM 11 (in step S16) and executes the program which is downloaded to the internal RAM 12 starting from the head address "0x00000H."

In the above-mentioned construction, the address bus and the data bus are used and the input/output port is not used when the data is downloaded to the internal RAM 12 from the external memory 20. The transfer program for downloading is prestored in the internal ROM 11 and data after transfer to the internal RAM 12 is rearranged so that the address corresponds to the external memory 20. Accordingly, the CPU 14 can promptly access the transfer data.

Further, the program data is rearranged at the area including the boot area and the vector table of the internal RAM and, therefore, the performance of the response to the interrupt is not degraded. Because the setting of the number of waits and the switching of the connection and the processes are performed by providing the dedicated register, the data can be transferred at a high speed and the processes of the program can be made simple.

Although the functional blocks and the flowchart are shown and referred to in the above description, the modifications such as separation and combination of the functions or parallel processing and exchange of the processing routine are possible so far as the functions are satisfied and the above description does not limit the present invention.

According to the present invention, advantageously, it is possible to transfer data from the external memory at a high speed and at a high efficiency and to efficiently execute the program which is downloaded to the internal RAM.

What is claimed is:

1. A method of transferring program data for use by a microcomputer to an internal memory of a microcomputer from an external memory, which is connected to the microcomputer via a bus, comprising:

providing said microcomputer with an internal ROM for storing a transfer program which transfers program data from said external memory to said internal memory and which serves as an algorithm;

directly transferring the program data, which is recorded in said external memory, by using an address bus and a data bus in accordance with said transfer program of said internal ROM;

recording the program data to be transferred and set data including wait information in said external memory; and receiving at least said wait information thereof by said microcomputer before the program data which is recorded in said external memory is transferred to said internal memory.

2. A method according to claim 1, further comprising the steps of:

starting the transfer program which is stored in said internal ROM by said microcomputer by transmitting the set data at a predetermined area including the wait information from said external memory via said address bus and said data bus when reset is released;

transferring said program data by said microcomputer from said predetermined area to an internal RAM serving as an internal memory which is readable and writable via said address bus and said data bus on a transfer program in accordance with said wait information;

rearranging an area of the internal RAM of data obtained by converting a head address of data which is transferred to the internal RAM into a head address of the predetermined area in said external memory and by transferring the converted data to an area including a boot area and a vector table by said microcomputer; and starting execution of said program by the transferred program data by said microcomputer.

3. A microcomputer for transferring program data from an external memory which is connected thereto via a bus to an internal memory, comprising:

an internal ROM for prestoring a transfer program which transfers program data to be transferred to the internal memory from said external memory, said external memory recording said program data to be transferred at a predetermined area and set data including wait information thereof; and an internal RAM including a boot area and a vector table, wherein on said transfer program, the program data to be transferred is transferred to said internal RAM and, thereafter, an area of the internal RAM is rearranged at said predetermined area of the external memory.

4. A microcomputer according to claim 3, further comprising:

a dedicated register for controlling a switching operation of an address and a signal to execute the transfer program of said internal ROM.

5. A microcomputer according to claim 4, wherein said dedicated register rearranges the area of the internal RAM to an area including the boot area and the vector table by switching and changing a head address of the internal RAM to a head address of the predetermined area in said external memory when the transfer of said program data ends.

* * * * *

UNITED STATES PATENT AND TRADEMARK OFFICE
CERTIFICATE OF CORRECTION

PATENT NO. : 6,766,448 B2
DATED : July 20, 2004
INVENTOR(S) : Kei Kubota

It is certified that error appears in the above-identified patent and that said Letters Patent is hereby corrected as shown below:

<u>Title page,</u>
Item [73], Assignee, should read -- NEC Electronic Corporation, Tokyo (JP) --.

Signed and Sealed this

Eighteenth Day of October, 2005

JON W. DUDAS
*Director of the United States Patent and Trademark Office*